United States Patent

Deliberis, Jr.

[11] Patent Number: 6,075,480
[45] Date of Patent: Jun. 13, 2000

[54] DOWN RANGE RETURNS SIMULATOR

[76] Inventor: Romeo A. Deliberis, Jr., 5604 Karlton Dr., Huntsville, Ala. 38802

[21] Appl. No.: 09/177,895

[22] Filed: Oct. 23, 1998

[51] Int. Cl.⁷ .................................................. G01S 7/40
[52] U.S. Cl. ...................... 342/169; 342/171; 342/194; 342/195; 342/196
[58] Field of Search .................... 434/1, 2, 3, 4, 434/5; 342/165, 169, 170, 171, 172, 173, 174, 175, 194, 195, 196, 197

[56] References Cited

U.S. PATENT DOCUMENTS

| | | | |
|---|---|---|---|
| H481 | 6/1988 | Filardo et al. | 342/170 |
| 3,769,442 | 10/1973 | Heartz et al. | 342/169 |
| 3,903,521 | 9/1975 | Jensen et al. | 342/168 |
| 3,982,244 | 9/1976 | Ward et al. | 342/169 |
| 4,005,424 | 1/1977 | Fetter | 342/171 |
| 4,168,502 | 9/1979 | Susie | 342/172 |
| 4,450,447 | 5/1984 | Zebker et al. | 342/171 |
| 4,625,209 | 11/1986 | Lawrence et al. | 342/169 |
| 4,665,403 | 5/1987 | Edvardsson | 342/124 |
| 5,039,991 | 8/1991 | Boese et al. | 342/420 |
| 5,133,663 | 7/1992 | Willingham et al. | 434/2 |
| 5,134,412 | 7/1992 | Baseghi et al. | 342/169 |
| 5,192,208 | 3/1993 | Ferguson et al. | 434/2 |
| 5,247,843 | 9/1993 | Bryan . | |
| 5,431,568 | 7/1995 | Fey et al. | 434/2 |
| 5,457,463 | 10/1995 | Vencel et al. | 342/169 |
| 5,721,554 | 2/1998 | Hall et al. | 342/165 |

FOREIGN PATENT DOCUMENTS

| | | |
|---|---|---|
| 0 316 616 | 5/1989 | European Pat. Off. . |
| 4002857 | 9/1991 | Germany . |
| 61-225678 | 10/1986 | Japan . |
| 1-201180 | 8/1989 | Japan . |
| 1-313785 | 12/1989 | Japan . |
| 2-183187 | 7/1990 | Japan . |
| 2209643 | 5/1989 | United Kingdom . |
| WO 88/08987 | 11/1988 | WIPO . |
| WO 89/08854 | 9/1989 | WIPO . |

OTHER PUBLICATIONS

An article entitled "Simulators as Test Equipment and Training Devices for EIJ and Radar", published in Mar., 1980 on pp. 28, 30, 32, 38, 40, 42, 41, 70, and 71 of a magazine entitled *Military Electronics/Countermeasures*.

An article entitled "A Target Simulator for Frequency Agile Radars" by John A.H. Wall, published in Sep., 1980 on pp. 251–256 of a document entitled *Conference: Proceedings of the 11th European Microwave Conference*.

*Primary Examiner*—Bernarr E. Gregory
*Attorney, Agent, or Firm*—Richard C. Litman

[57] ABSTRACT

A down range returns simulator for generating simulated radar reflected returns for testing advanced radar waveforms and associated signal processing. The simulator generates return signals based from real mission data, data transforms, arbitrary reference waveform convolutions, and radio and intermediate frequencies. The simulator includes a source of field data, synthetic target, an analog to digital converter for generating digital waveform returns, and RF/IF waveform generator, and a source of clutter waveform characteristics (OPINE, weather, and electronic counter-measures effects). The RF/IF waveform generator uses FFTs and IFFTs in order to develop realistic digital samples for evaluation software and Doppler images. The simulator apparatus provides a target return simulation as if received by radar in a down range mission flight test without the costly expense of conducting a mission flight test for collecting the appropriate data signatures for evaluation.

13 Claims, 2 Drawing Sheets

DOWN RANGE RETURNS SIMULATOR

BACKGROUND OF THE INVENTION

1. Field of the Invention

The present invention relates to military applications of signal processing related to radar and communication recorded and simulated signals.

2. Description of the Related Art

Since the use of radio detection and ranging (hereinafter referred to as radar) during World War II, signal processing has been required to analyze signal returns which were reflected from targets. Signal processing is performed on the reflected target returns and a reference of the original transmitted signals. Currently, radar systems and their signal processors must be tested in hardware-in-the-loop (HIL) studies using simulated targets and recorded returns from flight tests as well as during mission flight tests on real targets. Mission flight tests typically cost approximately 25 million dollars to conduct and HIL studies using mission flight test data are limited to using the radar waveforms that were used during the mission flight test. Mission flight test data has been taken since the 1960s and exists on computer data tapes. As new radars are developed costly and repetitive mission flight tests must be conducted to test the new radars, their advanced transmitted waveform repertoire, and their advanced signal processing capability. With the large volume of recorded mission flight test data, a logical motivation is to reconstruct these recorded data into formats that can be convolved with any advanced reference waveform so that these recorded and costly to gather mission flight test data could serve to test new advanced waveforms and signal processors. Currently there is no way to reconstruct these data into radio frequency returns which can be referenced to the non-linear frequency modulated (LFM) waveforms sampled at different bandwidths and different operating frequencies that were used to gather the recorded mission flight test data.

The related art is represented by the following patents of interest.

U.S. Statutory Invention Registration Number H481, issued on Jun. 1, 1988 to Francis X. Filardo et al., describes a microprocessor-controlled RF modulator apparatus which is controllable in both attenuation range and frequency. Filardo et al. do not suggest a down range returns simulator according to the claimed invention.

U.S. Pat. No. 3,903,521, issued on Sep. 2, 1975 to Garold K. Jensen et al., describes a signal simulator which will produce video signals suitable for driving an acceleration gate radar system in a manner of operation likely to be encountered with actual return signals from ballistic missiles and the like. Jensen et al. do not suggest a down range returns simulator according to the claimed invention.

U.S. Pat. No. 4,005,424, issued on Jan. 25, 1977 to Richard W. Fetter, describes a waveform generator particularly suited for the simulation of Doppler radar returns from precipitation. Fetter does not suggest a down range returns simulator according to the claimed invention.

U.S. Pat. No. 4,168,502, issued on Sep. 18, 1979 to William F. Susie, describes a target signal simulator for generating a simulated target signal useful in testing the receiver and data processing portions of radar systems that includes means for accepting a synchronizing signal having a PRF and duty cycle substantially equal to the PRF and duty cycle of the transmitter utilized by the radar system to be tested. Susie does not suggest a down range returns simulator according to the claimed invention.

U.S. Pat. No. 4,450,447, issued on May 22, 1984 to Howard A. Zebker et al., describes a synthetic aperture radar target simulator for altering the frequency and delay of an input rf signal by an amount related to range curvature information and Doppler frequency information associated with a simulated target. Zebker et al. do not suggest a down range returns simulator according to the claimed invention.

U.S. Pat. No. 4,625,209, issued on Nov. 25, 1986 to Gene W. Lawrence et al., describes a terrain return (clutter) generator for use in radar evaluation. Lawrence et al. do not suggest a down range returns simulator according to the claimed invention.

U.S. Pat. No. 4,665,403, issued on May 12, 1987 to Kurt 0. Edvardsson, describes method and apparatus for measuring the distance from an antenna to the surface of a fluent material such as a liquid or a particulate solid material with the use of a microwave signal, the frequency of which varies substantially linearly during a measuring interval and one part of which is emitted from the antenna towards the surface to be reflected therefrom and, after a propagation time corresponding to the sought distance, to be received and mixed with the signal which has been emitted at that instant, so that a measuring signal with a measurement frequency dependent upon the distance is obtained. Edvardsson does not suggest a down range returns simulator according to the claimed invention.

U.S. Pat. No. 5,039,991, issued on Aug. 13, 1991 to Otto A. Boese et al., describes a system for receiving electromagnetic radiation, which may be subject to environmental perturbations, and producing a system output that is substantially unaffected by the perturbations. Boese et al. do not suggest a down range returns simulator according to the claimed invention.

U.S. Pat. No. 5,133,663, issued on Jul. 28, 1992 to Joseph A. Willingham et al., describes a portable automatic radar simulator which when connected to a transmitting means such as a magnetron generated microwave threat transmitter will simulate up to 2048 preprogrammed radar signature. Willingham et al. do not suggest a down range returns simulator according to the claimed invention.

U.S. Pat. No. 5,134,412, issued on Jul. 28, 1992 to Behshad Baseghi et al., describes an apparatus for simulating a signal received by a radar system in response to RF energy transmitted by an emitter. Baseghi et al. do not suggest a down range returns simulator according to the claimed invention.

U.S. Pat. No. 5,247,843, issued on Sep. 28, 1993 to Richard H. Bryan, describes a method and apparatus for using compact ranges to simulate electromagnetic environments for computer-driven test systems utilizing but not expending performance hardware. Bryan does not suggest a down range returns simulator according to the claimed invention.

U.S. Pat. No. 5,457,463, issued on Oct. 10, 1995 to Leslie J. Vencel et al., describes a radar return signal generator apparatus for generating one or more radar return signals representative of one or more remote objects useable in ground based, shipboard and airborne radar systems for testing radar and its user. Vencel et al. do not suggest a down range returns simulator according to the claimed invention.

U.S. Pat. No. 5,721,554, issued on Feb. 24, 1998 to Stanley R. Hall et al., describes a near field planar wavefront generation method that uses a relatively small number (three to five) of transmitting antennas to create a synthesized one-dimensional linear plane of radiation over 10 to 20 wavelengths at a specific location on an antenna array of a system under test at a specific frequency and distance, typically in the range of from 100 to 200 feet. Hall et al. do not suggest a down range returns simulator according to the claimed invention.

Germany Patent document 4,002,857, published on Sep. 19, 1991, describes a device for ascertaining the mean Doppler frequency of a synthetic aperture radar in real time by reading complex data in a buffer memory module as range lines and reading out as azimuth lines. Germany '857 does not suggest a down range returns simulator according to the claimed invention.

Great Britain Patent document 2,209,643 A, published on May 17, 1989, describes a pulse compression radar. Great Britain '643 does not suggest a down range returns simulator according to the claimed invention.

International Patent document WO88/08987, published on Nov. 17, 1988, describes a method for implementing the test in operation of a radar information display device such as a digital transformer for images. International '987 does not suggest a down range returns simulator according to the claimed invention.

International Patent document WO89/08854, published on Sep. 9, 1989, describes a radar test set target which is co-located with the radar and produces a faithful replica of the radar signal substantially delayed in time. International '854 does not suggest a down range returns simulator according to the claimed invention.

Japan Patent document 61-225678, published on Oct. 7, 1986, describes a pseudo target generator for pulse Doppler radar. Japan '678 does not suggest a down range returns simulator according to the claimed invention.

Japan Patent document 1-201180, published on Aug. 14, 1989, describes a dummy signal generating device for radar. Japan '180 does not suggest a down range returns simulator according to the claimed invention.

Japan Patent document 1-313785, published on Dec. 19, 1989, describes a radar simulator system. Japan '785 does not suggest a down range returns simulator according to the claimed invention.

Japan Patent document 2-183187, published on Jul. 17, 1990, describes a method and apparatus for generating a simulated object signal. Japan '187 does not suggest a down range returns simulator according to the claimed invention.

An article entitled "Simulators as Test Equipment and Training Devices for EW and Radar" by James B. Y. Tsui, published in September, 1989 on pages 38, 40, 42, 44, 46, 48, and 50 of the *MICROWAVE JOURNAL*, describes three different types of frequency channelizers according to their outputs. The Tsui article does not suggest a down range returns simulator according to the claimed invention.

An article entitled "Channelizers and Frequency Encoders", published in March, 1980 on pages 28, 30, 32, 38, 40, 42, 41, 70, and 71 of a magazine entitled *Military Electronics/Countermeasures*, describes a description of four systems for test and training purposes. The *Military Electronics/Countermeasures* article does not suggest a down range returns simulator according to the claimed invention.

An article entitled "A Target Simulator for Frequency Agile Radars" by John A. H. Wall, published in September, 1980 on pages 251–256 of a document entitled *Conference: Proceedings of the 11th European Microwave Conference*, describes a prototype radar target simulator possessing features essential for testing frequency-agile and coherent systems. The Wall article does not suggest a down range returns simulator according to the claimed invention.

None of the above inventions and patents, taken either singularly or in combination, is seen to describe the instant invention as claimed.

SUMMARY OF THE INVENTION

The present invention is a down range returns simulator for generating simulated radar reflected returns for testing advanced radar waveforms and associated signal processing. The down range returns simulator generates return signals based from real mission data, data transforms, arbitrary reference waveform convolutions, and radio frequencies and/or intermediate frequencies. The down range returns simulator includes a source of field data, synthetic target, an analog to digital converter for generating digital waveform returns, an RF/IF waveform generator, and a source of clutter waveform characteristics (OPINE, weather, and ECM effects). The RF/IF waveform generator uses FFTs and IFFTs in order to develop realistic digital samples for evaluation software and Doppler images. The down range returns simulator provides a target return simulation as if received by radar in a down range mission flight test without the costly expense of conducting a mission flight test for collecting the appropriate data signatures for evaluation.

The down range returns simulator generates the return of a reflected signal from an object as if the receiver of this return is operating in a mission flight test or "down range" flight test configuration. The down range returns simulator provides a testbed source using previously recorded and existing field mission data convolved with any reference modulation for test of newly developed waveforms and signal processors. The down range returns simulator can also be used with synthetically generated data.

The mission flight test and/or synthetic target data has its mean Doppler removed and is de-resolved or re-sampled for the bandwidth(s) of interest. Next, target sizes are scaled to translate the center frequency that the data was taken to the center frequency of the signal processor. Where required the range rate Doppler is reinserted. These new data samples represent raw in phase (I) and quadrature (Q) data as if it were stored in advanced radar with the new characteristics of bandwidth, center frequency, etc. These generated I and Q data are converted to the target spectrum and convolved with any reference modulation such as pseudo random noise, frequency jump, or any other. The data is converted to a time domain sequence of the advanced radar's target returns and scaled to match the bits of the digital to analog converters of a waveform generator. The waveform generator converts the digital data to radio frequency (RF) or intermediate frequency (IF) or baseband signals. These signals represent the radar target returns which would be experienced if the radar is receiving them down range as if in a mission flight test.

The down range returns simulator block comprises real field data, synthetic target data, a digital waveform returns generator, a waveform generator, signal processors under test, signal processor evaluation software, range Doppler images, and corruption effects. Real field data is transformed by the digital waveform returns generator into digital waveform data. Synthetic target data can be substituted for real field data, which is especially important for calibration. Corruption effects can be added to simulate operation in various clutter waveform characteristics (i.e., nuclear environment, weather, and electronic counter-measures effects). The digital waveform data is loaded into a waveform generator. The waveform generator produces RF/IF down range return signals for the signal processor under test.

These signal processors produce their own I and Q data which must be evaluated with software. This software produces range Doppler images which can be compared to the original returns.

The down range returns simulator waveform generation process comprises a modulation time sequence, a fast Fourier transform (FFT), a modulation waveform spectrum, a field data signal spectrum, a multiplication, an inverse FFT, a time domain signal response, a waveform generator, an RF/IF signal, a signal processor, and I and Q digital data. I and Q field data or synthetic data is processed to have any translational motion removed. Target sizes are scaled to translate the center frequency from the original frequency that the data was taken at the center frequency of the radar to be simulated. The data is interpolated through an FFT pad to match the number of samples to the FFT size that will be used to perform the convolution. The uncollapsed target spectrum is produced. An analytic modulation time sequence is derived and transformed by an FFT. The modulation waveform spectrum is produced. Through a point by point multiplication and an IFFT the time return signal response is created. These time domain data are scaled to the number of bits of the digital to analog converters of the waveform generator. The waveform generator converts the digital data to RF or IF down range signal returns. The signal is received by the signal processor under test and digital I and Q data is produced.

Accordingly, it is a principal object of the invention to provide a down range returns simulator which utilizes real mission flight test or synthetically generated data to test advanced radar waveforms and advanced signal processors without conduction of new and costly mission flight tests.

It is another object of the invention to provide a down range returns simulator generates a radar return of real field data with any reference waveform modulation or replica of the radar's transmitted signal that would be seen in an actual mission flight test.

It is a further object of the invention to provide a down range returns simulator which simulates real field data, synthetic target data operating in nuclear environments (OPINE, adverse weather conditions, and electromagnetic interference (EMI) and electronic counter-measures environments.

It is an object of the invention to provide improved elements and arrangements thereof in a down range returns simulator for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a down range returns simulator for generating simulated radar reflected returns for testing advanced radar waveforms and associated signal processing. The simulator generates return signals based from real mission data, data transforms, arbitrary reference waveform convolutions, and radio and intermediate frequencies. The simulator includes a source of field data, synthetic target, an analog to digital converter for generating digital waveform returns, and RF/IF waveform generator, and a source of clutter waveform characteristics (OPINE, weather, and ECM effects). The RF/IF waveform generator uses FFTs and IFFTs in order to develop realistic digital samples for evaluation software and Doppler images. The simulator apparatus provides a target return simulation as if received by radar in a down range mission flight test without the costly expense of conducting a mission flight test for collecting the appropriate data signatures for evaluation.

The down range returns simulator generates the return of a reflected signal from an object as if the receiver of this return is operating in a mission flight test or "down range" flight test configuration. The down range returns simulator provides a testbed source using previously recorded and existing field mission data convolved with any reference modulation for test of newly developed waveforms and signal processors. The down range returns simulator can also be used with synthetically generated data.

The mission flight test and/or synthetic target data has its mean Doppler removed and is de-resolved or re-sampled for the bandwidth(s) of interest. Next, target sizes are scaled to translate the center frequency that the data was taken to the center frequency of the signal processor. Where required the range rate Doppler is reinserted. These new data samples represent raw in phase (I) and quadrature (Q) data as if it were stored in advanced radar with the new characteristics of bandwidth, center frequency, etc. These generated I and Q data are converted to the target spectrum and convolved with any reference modulation such as pseudo random noise, frequency jump, or any other. The data is converted to a time domain sequence of the advanced radar's target returns and scaled to match the bits of the digital to analog converters of a waveform generator. The waveform generator converts the digital data to radio frequency (RF) or intermediate frequency (IF) or baseband signals. These signals represent the radar target returns which would be experienced if the radar is receiving them down range as if in a mission flight test.

Figure 1:
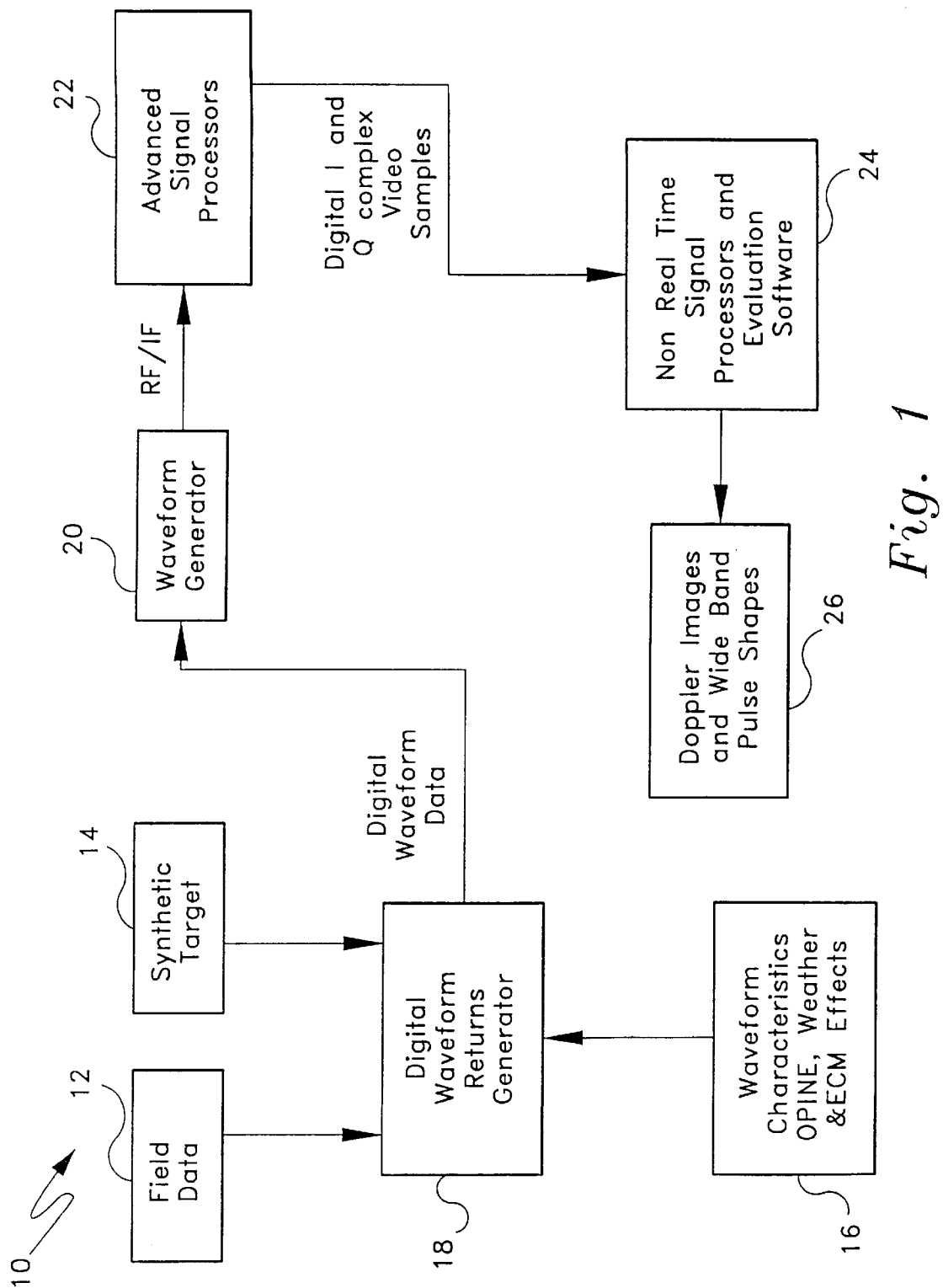
FIG. 1 is a block diagram of a down range returns simulator according to the present invention.

FIG. 1 depicts the down range returns simulator block diagram 10. The down range returns simulator 10 comprises real field data 12, synthetic target data 14, a digital waveform returns generator 18, a waveform generator 20, signal processors under test 22, signal processor evaluation software 24, range Doppler images 26, and corruption effects 16. Real field data 12 is transformed by the digital waveform returns generator 18 into digital waveform data. Synthetic target data 14 can be substituted for real field data, which is especially important for calibration. Corruption effects 16 can be added to simulate operation in various clutter waveform characteristics (i.e., nuclear environment, weather, and electronic counter-measures effects). The digital waveform data is loaded into a waveform generator 20. The waveform generator 20 produces RF/IF down range return signals for the signal processor 22 under test. These signal processors produce their own I and Q data which must be evaluated with software 24. This software produces range Doppler images 26 which can be compared to the original returns.

Figure 2:
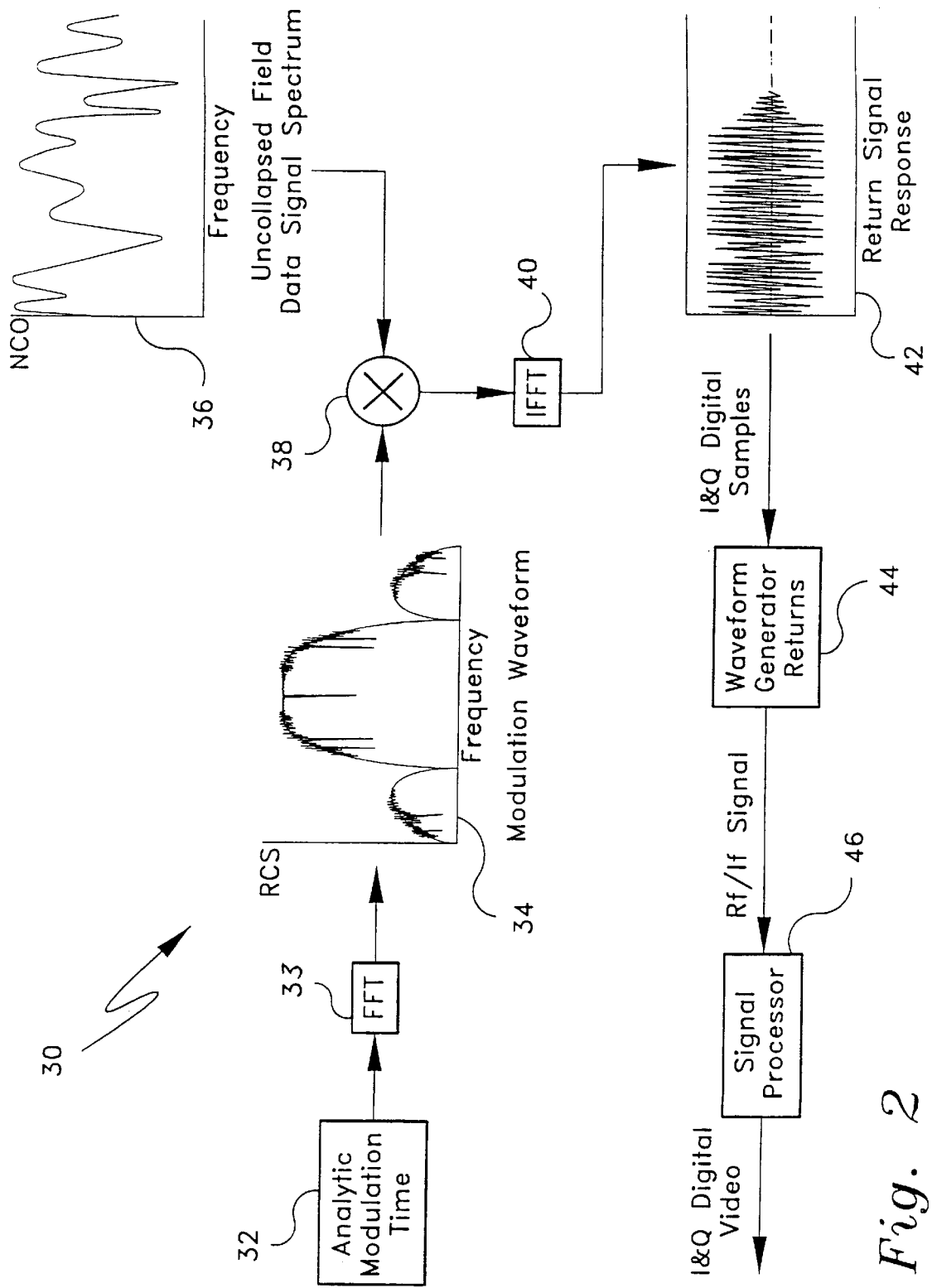
FIG. 2 is a waveform generation process according to the present invention.

FIG. 2 depicts the down range returns simulator waveform generation process 30 which comprises a modulation time sequence 32, a fast Fourier transform (FFT) 33, a modulation waveform spectrum 34, a field data signal spectrum 36, a multiplication 38, an inverse FFT 40, a time domain signal response 42, a waveform generator 44, an RF/IF signal, a signal processor 46, and I and Q digital data. I and Q field data or synthetic data is processed to have any translational motion removed. Target sizes are scaled to translate the center frequency from the original frequency that the data was taken at the center frequency of the radar to be simulated. The data is interpolated through an FFT pad 33 to match the number of samples to the FFT size that will be used to perform the convolution. The uncollapsed target spectrum is produced 36. An analytic modulation time sequence 32 is derived and transformed by an FFT 33. The modulation waveform spectrum 34 is produced. Through a point by point multiplication 38 and an IFFT 40 the time return signal response is created 42. These time domain data are scaled to the number of bits of the digital to analog converters of the waveform generator 44. The waveform generator 44 converts the digital data to RF or IF down range signal returns. The signal is received by the signal processor 46 under test and digital I and Q data is produced.

It is to be understood that the present invention is not limited to the embodiments described above, but encompasses any and all embodiments within the scope of the following claims.

I claim:

1. A method for generating simulated radar reflected returns for testing a signal processor, said method comprising the steps:

transforming real field data by a digital waveform returns generator into digital waveform data;

loading the digital waveform data into a waveform generator;

having the waveform generator produce down range return signals for a signal processor under test;

having the signal processor under test produce in phase and quadrature data;

evaluating the in phase and quadrature data with evaluation software; and, producing range Doppler images with the evaluation software that can be compared to original returns.

2. The method for generating simulated radar reflected returns according to claim 1, wherein the step of transforming real field data by a digital waveform returns generator into digital waveform data, further includes the addition of corruption effects to simulate operation in various clutter waveform characteristics.

3. The method for generating simulated radar reflected returns according to claim 2, wherein the addition of corruption effects simulates operation in a nuclear environment.

4. The method for generating simulated radar reflected returns according to claim 2, wherein the addition of corruption effects simulates operation in weather.

5. The method for generating simulated radar reflected returns according to claim 2, wherein the addition of corruption effects simulates operation in electronic countermeasures effects.

6. The method for generating simulated radar reflected returns according to claim 1, wherein the step of transforming real field data by a digital waveform returns generator into digital waveform data further comprises the steps:

generating a modulation time sequence;

processing the modulation time sequence with a fast Fourier transform;

generating a modulation waveform spectrum;

generating a field data signal spectrum;

multiplying the modulation waveform spectrum with the field data signal spectrum;

processing the multiplied modulation waveform spectrum and the field data signal spectrum in an inverse fast Fourier transform;

producing a time domain signal response after the inverse fast Fourier transform processing.

7. A down range returns simulator for testing a signal processor, said down range returns simulator comprising:

a digital waveform returns generator for transforming data into digital waveform data;

means for providing said digital waveform returns generator with real field data;

means for providing said digital waveform returns generator with synthetic target data;

means for providing said digital waveform returns generator with corruption effects data;

a waveform generator for producing down range return signals that are loaded into the signal processor, wherein the signal processor produces in phase and quadrature data based on the down range return signals; and, signal processor evaluation software means for evaluating the in phase and quadrature data, and for producing range Doppler images that can be compared to original returns.

8. A method for generating simulated radar reflected returns for testing at least one signal processor, said method comprising the steps:

transforming synthetic target data by a digital waveform returns generator into digital waveform data.

loading the digital waveform data into a waveform generator;

having the waveform generator produce down range return signals for the at least one signal processor;

having the at least one signal processor produce in phase and quadrature data;

evaluating the in phase and quadrature data with evaluation software; and, producing range Doppler images with the evaluation software that can be compared to original returns.

9. The method for generating simulated radar reflected returns according to claim 8, wherein the step of transforming synthetic target data by a digital waveform returns generator into digital waveform data, further includes the addition of corruption effects to simulate operation in various clutter waveform characteristics.

10. The method for generating simulated radar reflected returns according to claim 9, wherein the addition of corruption effects simulates operation in a nuclear environment.

11. The method for generating simulated radar reflected returns according to claim 9, wherein the addition of corruption effects simulates operation in weather.

12. The method for generating simulated radar reflected returns according to claim 9, wherein the addition of corruption effects simulates operation in electronic countermeasures effects.

13. The method for generating simulated radar reflected returns according to claim 9, wherein the step of transforming synthetic target data by a digital waveform returns generator into digital waveform data further comprises the steps:

generating a modulation time sequence;

processing the modulation time sequence with a fast Fourier transform;

generating a modulation waveform spectrum;

generating a field data signal spectrum;

multiplying the modulation waveform spectrum with the field data signal spectrum;

processing the multiplied modulation waveform spectrum and the field data signal spectrum in an inverse fast Fourier transform;

producing a time domain signal response after the inverse fast Fourier transform processing.

* * * * *